United States Patent [19]

Takahashi

[11] Patent Number: 5,707,076
[45] Date of Patent: Jan. 13, 1998

[54] AIR BAG DEVICE

[75] Inventor: Toshinori Takahashi, Konan, Japan

[73] Assignee: Toyoda Gosei Co., Ltd., Aichi-Ken, Japan

[21] Appl. No.: 698,400

[22] Filed: Aug. 15, 1996

[30] Foreign Application Priority Data

Aug. 16, 1995 [JP] Japan .................. 7-208681

[51] Int. Cl.$^6$ .................. B60R 21/32; G01B 7/14
[52] U.S. Cl. .................. 280/735; 280/730.2; 180/274; 340/436; 324/207.16; 324/207.26
[58] Field of Search .................. 280/734, 735, 280/730.2; 180/274; 340/436; 324/207.15, 207.16, 207.26, 234, 236

[56] References Cited

U.S. PATENT DOCUMENTS

| | | | |
|---|---|---|---|
| 4,023,056 | 5/1977 | Yamada et al. | 280/735 |
| 4,866,418 | 9/1989 | Dobler et al. | 180/271 |

FOREIGN PATENT DOCUMENTS 5-563  1/1993  Japan .

*Primary Examiner*—Paul N. Dickson
*Attorney, Agent, or Firm*—Cushman Darby & Cushman, IP Group of Pillsbury Madison & Sutro LLP

[57] ABSTRACT

An air bag device is provided which uses an eddy current position sensor. A coil of the sensor is disposed on a seat frame or the like, as a portion of a vehicle body, which is difficult to deform at the beginning of a collision. A metal body as a detected body of the sensor is disposed on a portion, facing the coil, of a rocker panel, which is a portion of the vehicle body, that is easily deformable at the beginning of a collision. The sensor may be disposed at other portions, e.g. inside a pillar or a door. An inductance of the coil influences a resonance condition of a resonance circuit. An output of the resonance circuit is rectified by a rectifier circuit. An ignition control circuit detects an output of the rectifier circuit and outputs an ignition command signal to a squib of an inflator, based upon at least one of an output value and a change rate of the output value of the rectifier circuit, thereby inflating an air bag.

8 Claims, 11 Drawing Sheets

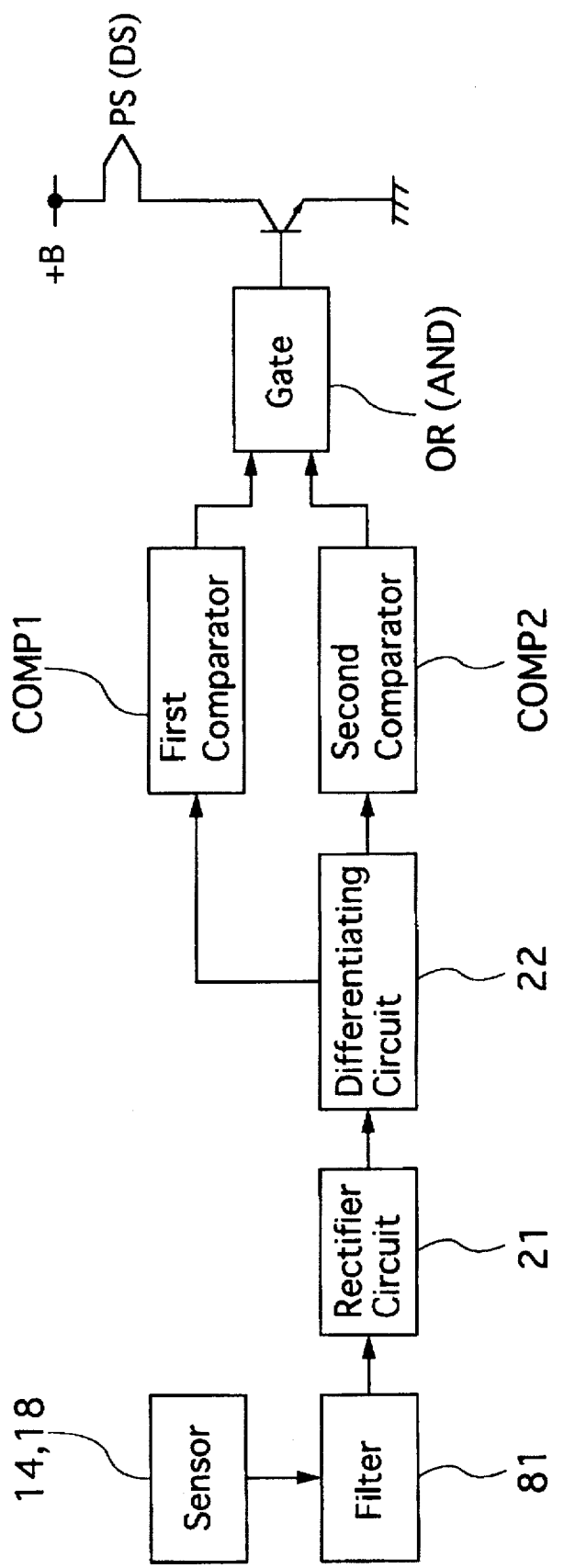

5,707,076

AIR BAG DEVICE

The priority application JP-7-208681, filed in Japan on Aug. 16, 1995 is hereby incorporated into the present specification by reference.

BACKGROUND OF THE INVENTION

1. Field of the Invention

This invention relates to an air bag device as an occupant crash protection device for ensuring passive safety of an occupant in a vehicle. Particularly, the invention relates to an air bag device that can detect a side collision or a head-on collision of the vehicle.

2. Description of the Related Art

In recent years, air bag devices have been used for assuring passive safety of occupants in a vehicle in the automobile industry. In addition to a head-on collision air bag device, a side collision air bag device tends to be adopted nowadays in order to protect the occupant from a side impact. Such a side collision air bag device has a sensor, for example, a touch switch on a side door beam inside a door, defining a crash sensor for detecting a side collision.

Japanese Utility Model Publication (Kokai) No. 5-563 shows a side collision air bag device.

This air bag device has side crash sensors disposed at a position facing the right and left door panels, respectively, at a fixed interval. When the door panel is deformed at the time of crash and pushes the facing sensor, the air bag is operated. Namely, the sensor is composed of a fixed contact and a movable contact. The movable contact is secured to the door panel. When the door is deformed, the movable contact moves together with the deforming door panel and comes near to the fixed contact. Finally, the movable contact and the fixed contact touch and are electrically connected with each other, thus operating the air bag device.

However, the above air bag device uses a switch sensor, so that crash sensing is performed locally at a small area. Thus, it is possible that the air bag device operates by an energy other than an impact energy, for example, when a running vehicle kicks up a small stone and such a stone hits the door, when somebody unintentionally kicks the door, or when the door is contacted by an obstacle in parking the vehicle. Moreover, there is a possibility that the air bag device may be deployed even at a slow driving speed when it is unnecessary to operate the air bag device. To cope with these problems, a plurality of expensive sensors need to be arranged on the right and left door panels. Thus, the number of the sensors increases, so that the costs of the device may rise and a circuit therefor may be complicated.

Furthermore, in case of a side collision, a crashable zone of a vehicle body is small as compared with the head-on collision. Therefore, a detection time for collision should be as short as possible.

SUMMARY OF THE INVENTION

The present invention is provided to improve upon air bag devices particularly used for a collision with a small crashable zone or stroke. In order to achieve this end, one or more aspects of the invention may be followed in order to bring about one or more specific objects and advantages, such as those noted below.

It is an object of the invention to provide an air bag device that can detect a side collision with a simple circuit and at low cost.

An air bag device is provided according to one aspect of the invention. The air bag device is provided in a cabin of a vehicle and comprises an air bag disposed in the cabin and an inflator for inflating the air bag. An eddy current position sensor has a coil and a metal body. The coil and the metal body are disposed on opposite portions of the vehicle body so as to face each other. One of the opposite portions is easy to deform while the other of the opposite portions is difficult to deform at the beginning of collision. An ignition control circuit includes a resonance circuit having a resonance condition influenced by an inductance of the coil. The ignition control circuit outputs an ignition command signal to the inflator based upon an output from the resonance circuit.

BRIEF DESCRIPTION OF THE DRAWINGS

FIG. 15 is a circuit diagram showing another modification of a resonance circuit of the inventive air bag device.

DETAILED DESCRIPTION OF PREFERRED EMBODIMENTS

Figure 1:
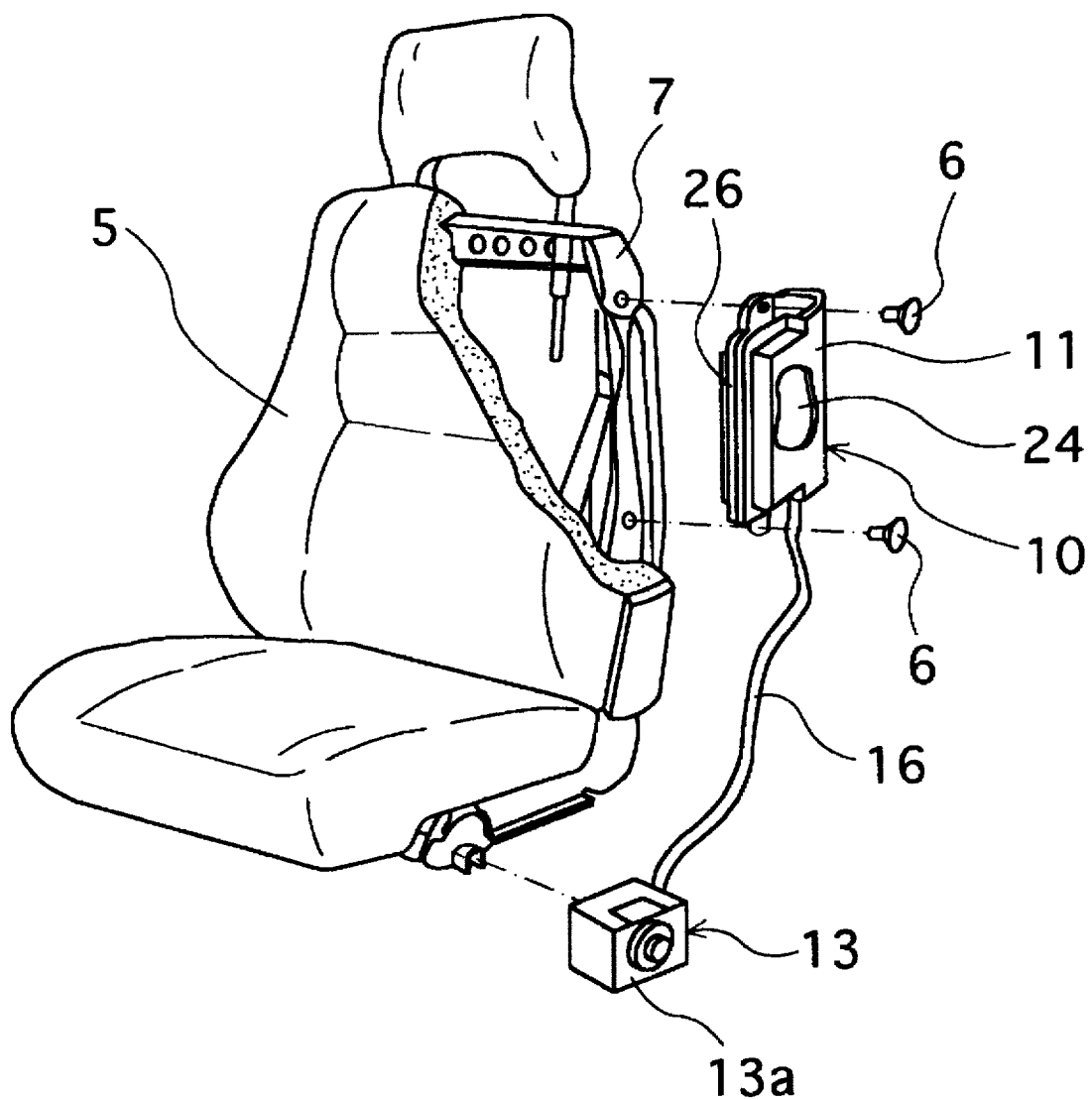
FIG. 1 is a perspective view showing a first embodiment of an air bag device of the invention together with a seat on which the air bag device is mounted.
Figure 2:
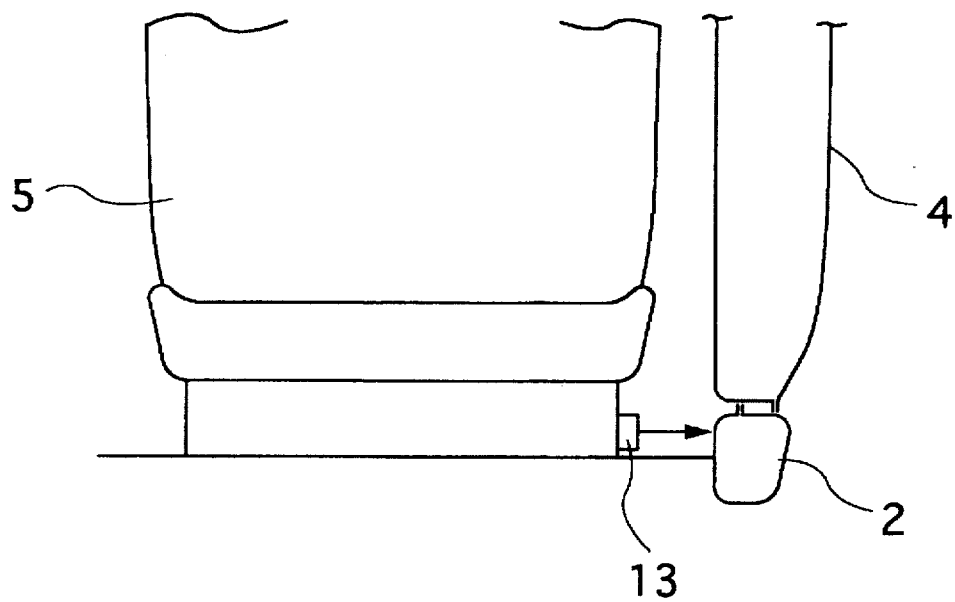
FIG. 2 is an explanatory view showing a specific attaching position of a sensor unit, to the seat, in the first embodiment of the air bag device of the invention.
Figure 3:
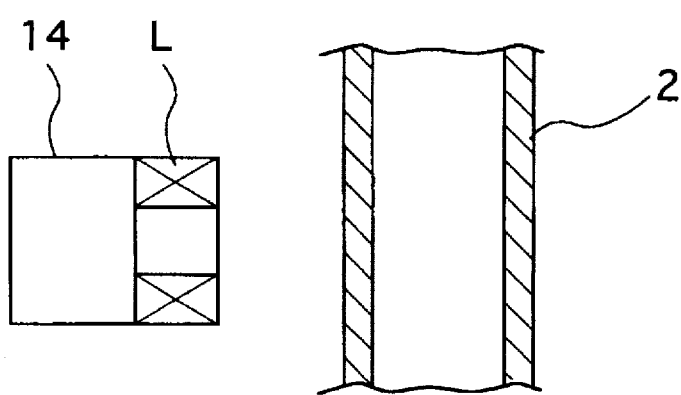
FIG. 3 is an explanatory view showing a schematic structure of a sensor of the first embodiment of the air bag device of the invention.
Figure 4:
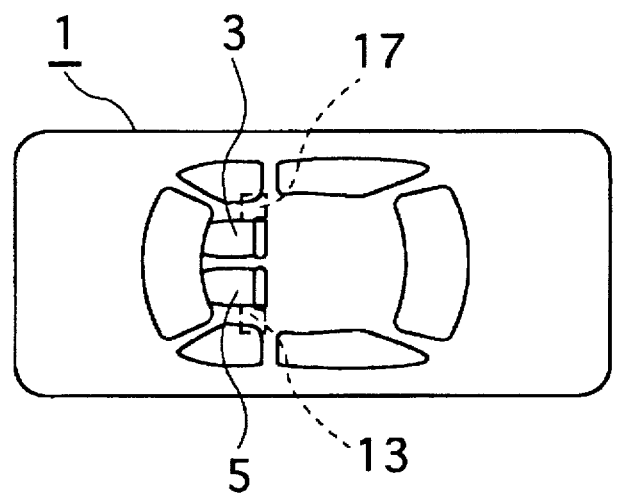
FIG. 4 is an explanatory view showing attaching positions of sensor units, in a vehicle cabin, in the first embodiment of the air bag device of the invention.
Figure 5:
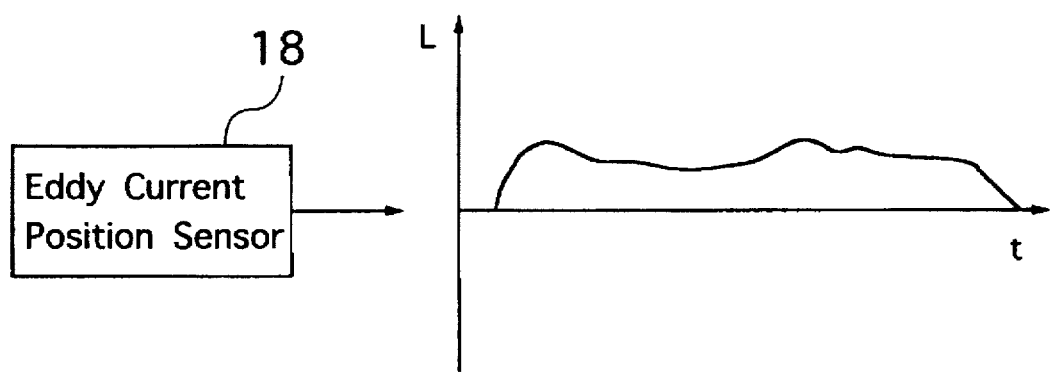
FIG. 5 is a graph showing an output signal waveform of the sensor, at the time of a side collision, of the first embodiment of the air bag device of the invention.
Figure 6A:
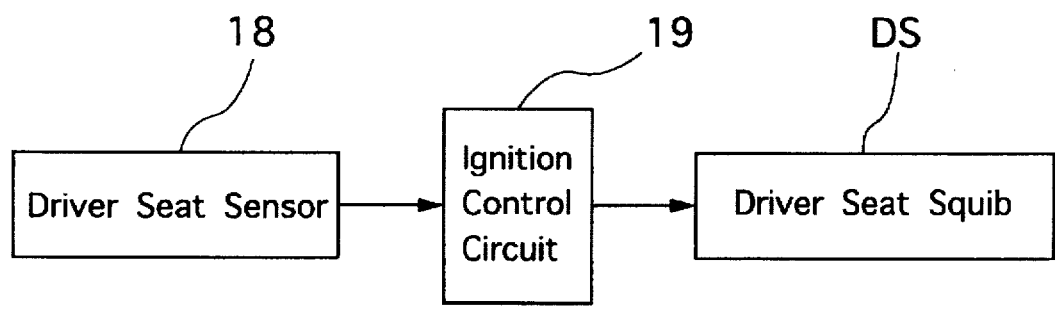
FIG. 6a is a block diagram showing an electrical structure of a driver seat side air bag device according to the first embodiment of the invention.
Figure 6B:
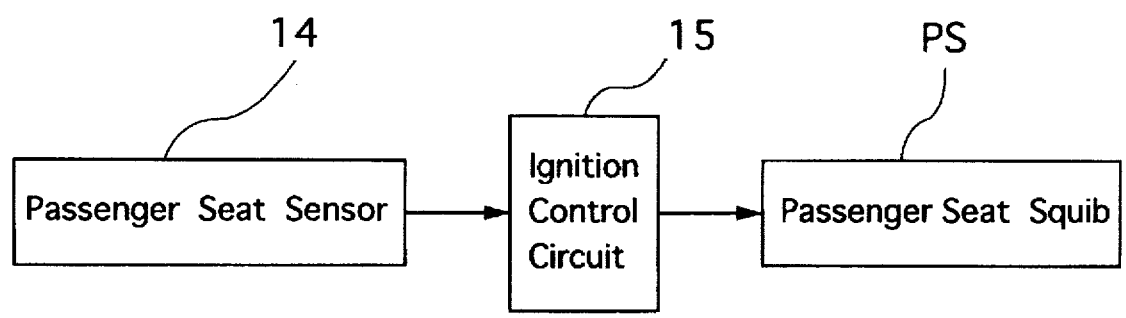
FIG. 6b is a block diagram showing an electrical structure of a passenger seat side air bag device according to the first embodiment of the invention.

FIGS. 1 to 3 show a first embodiment of an air bag of the invention which is mounted on a passenger seat, respectively. FIG. 4 shows attaching positions of sensor units of the air bag according to the first embodiment, each of which contains therein an eddy current position sensor. FIG. 5 shows an output signal waveform of the eddy current position sensor at the time of a side collision. FIGS. 6a and 6b show electrical structures of right and left side air bag devices of the first embodiment, respectively.

As shown in FIGS. 1 to 3, the present embodiment discloses a side air bag device. The side air bag devices are arranged on the right and left sides, in a cabin, of a vehicle body 1, respectively, e.g. on a driver seat 3 and a passenger seat 5 at the sides of doors 4. FIG. 1 shows the side air bag device disposed on the passenger seat 5. The passenger seat side air bag device has an air bag module 10 and a sensor unit 13. The air bag module 10 has a casing 11 which accommodates therein an inflator 24 and a side air bag 26. The casing 11 is directly attached to a center in the vertical direction of a side surface, facing the door 4 (FIG. 2), of a seat frame 7 of the passenger seat 5, via screws 6.

On the other hand, the sensor unit 13 has a housing 13a which is made of a non-magnetic material and mounted on a lower end side surface, facing the door 4, of the seat frame 7. The housing 13a contains therein a sensor 14 and a control circuit 15. The sensor 14 detects a side impact energy and outputs a detection signal corresponding to the energy. The control circuit 15 decides whether to output an ignition signal for squib PS or not, on the basis of the output from the sensor 14 (FIG. 6b). When the air bag device should be operated, the control circuit 15 transmits the ignition signal to the inflator of the air bag module 10 via a lead wire 16 (FIG. 1), and ignites the squib PS. Thus, the inflator in the air bag module 10 generates gas so as to inflate and expand the air bag 26.

In the present embodiment of the air bag device, an eddy current position sensor is used as the sensor 14 for detecting impact at the time of collision. Namely, with reference to FIG. 3, the sensor 14 has a detection coil L mounted at the lower part of the seat frame 7 for generating an inductance. A rocker panel 2 of a steel also constitutes the sensor 14 as a metal body while facing the coil L. The sensor 14 detects a change of an eddy current loss generated at the rocker panel 2 as a change of a distance between the rocker panel 2 and the sensor 14. A specific circuitry of the sensor 14 and the control circuit 15 will be described later referring to FIG. 7.

A driver seat side air bag device is disposed on the driver seat 3, which has the same structure as the passenger seat side air bag device. The driver seat side air bag device has an air bag module (not shown) of the same structure as the air bag module 10 and a sensor unit 17 of the same structure as the sensor unit 13. The sensor unit 17 detects a right side collision by a sensor 18 incorporated in a housing. A control circuit 19 transmits an ignition signal to a driver seat side inflator and ignites the squib DS based on a detection signal of the sensor 18. Thus, the inflator generates gas so as to inflate and expand a driver seat side air bag.

Namely, the present embodiment provides the eddy current position sensors 14 and 18 of the same structure at the right and left of the vehicle body 1, i.e. the driver seat 3 and the passenger seat 5. Thus, each sensor 14, 18 can detect displacement or collision in the right and left direction of the vehicle body 1. For example, the driver seat side sensor 18 generates a voltage of positive polarity shown in FIG. 5 when there arises leftward displacement at the time of right side collision. The passenger seat side sensor 14 generates a similar voltage to the voltage shown in FIG. 5 when there arises rightward displacement at the time of left side collision. Each sensor 14, 18 may be constructed such that it generates an output voltage of reversed polarity to that shown in FIG. 5, namely, negative polarity. It is noted that the location of the driver seat and passenger seat described herein is for reference only. Thus, it can be appreciated that the driver's seat may be arranged on the left side of the vehicle with the passenger seat at the right side of the vehicle.

Next, a circuitry of the side air bag device of this embodiment is described.

Figure 7:
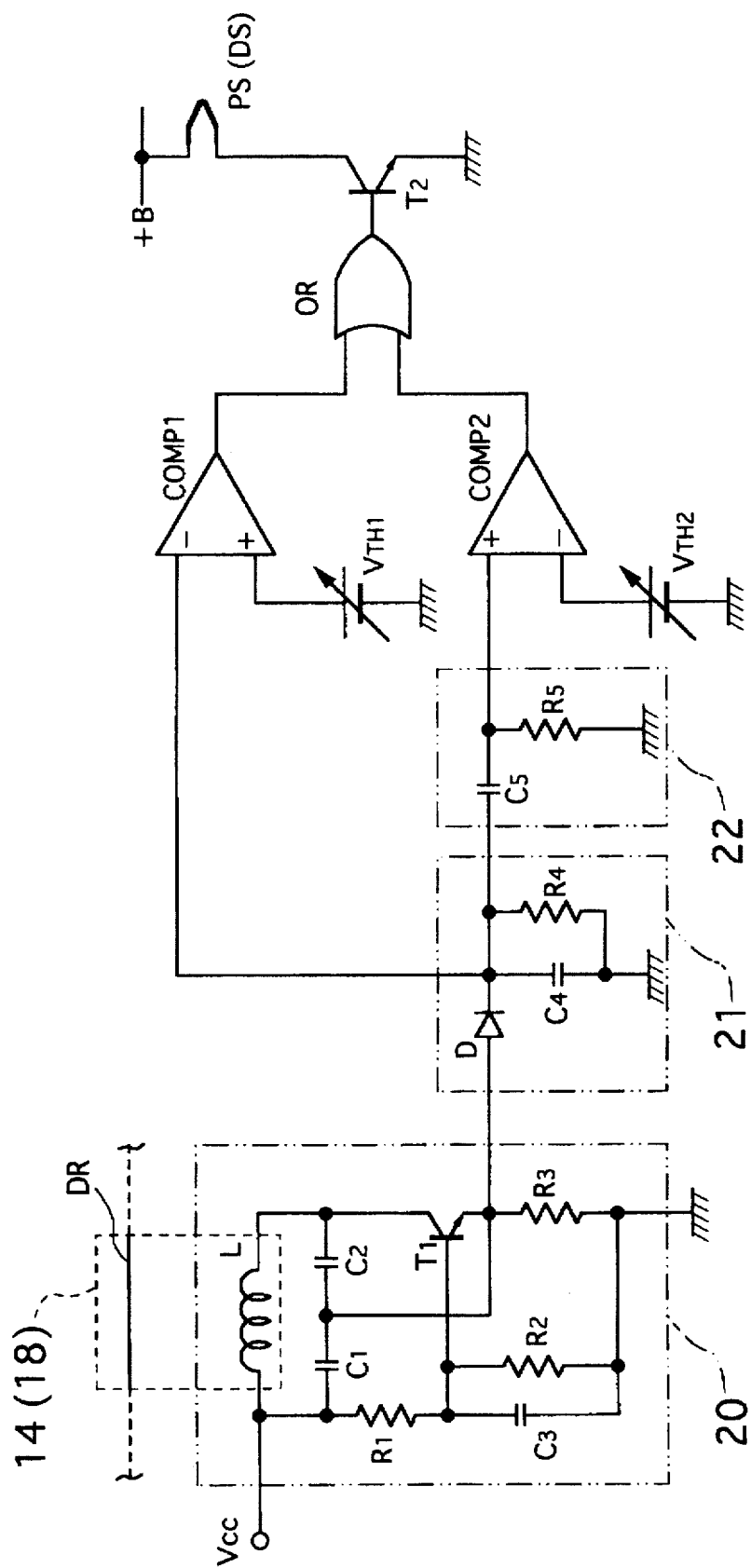
FIG. 7 is a circuit diagram showing a control system of the first embodiment of the air bag device of the invention.

FIG. 7 shows an ignition control circuit for the air bag device of the first embodiment.

This embodiment provides an ignition control circuit for controlling an ignition of the squib DS of the driver seat side inflator and an ignition control circuit for controlling an ignition of the squib PS of the passenger seat side inflator. FIG. 7 shows the passenger seat side ignition control circuit. The circuitry is the same, so only the passenger seat side ignition control circuit is described hereafter.

Referring to FIG. 7, the ignition control circuit includes an oscillator circuit 20 made of a Colpitts oscillator circuit having the sensor 14 as a self-excited oscillator circuit. The oscillator circuit 20 has an oscillating frequency f which is determined by an inductance of the coil L and capacitances of capacitors C1 and C2. The oscillating frequency f is expressed by the following equation. The oscillator circuit 20 self-excitedly oscillates at this oscillating frequency f.

$$f=\sqrt{\{1/L(C1 \cdot C2/C1+C2)\}}/2\pi$$

wherein L shows the inductance of the coil L, C1 shows the capacitance of the capacitor C1 and C2 shows the capacitance of the capacitor C2.

The inductance value of the coil L is determined by a distance between the coil L and the rocker panel 2. A resistors R1 and R2 and a capacitor C3 provide a base current of a transistor T1. A resistor R3 is an output resistance.

An output of the oscillator circuit 20 is input in a rectifier circuit 21. The rectifier circuit 21 has a diode D, a capacitor C4 and a resistor R4. The capacitor C4 smooths the output. The resistor R4 is a discharge resistance. The capacitor C4 lessens ripples of the rectified output. The resistor R4 heightens response of the output of the capacitor C4. The output of the rectifier circuit 21 is input in a differentiating circuit 22. The differentiating circuit 22 has a capacitor C5 and a resistor R5 and differentiates the output of the rectifier circuit 21.

The output of the rectifier circuit 21 is also input in a comparator COMP1. The comparator COMP1 compares the magnitude of the output of the rectifier circuit 21 with a predetermined threshold VTH1. When the output of the rectifier circuit 21 is not less than the threshold VTH1, the comparator COMP1 outputs "0". When the output of the rectifier circuit 21 is less than the threshold VTH1, the comparator COMP1 outputs "1". On the other hand, an output of the differentiating circuit 22 is input in a comparator COMP2. The comparator COMP2 compares the magnitude of the output of the differentiating circuit 22 with a predetermined threshold VTH2. When the output of the differentiating circuit 22 is not less than the threshold VTH2, the comparator COMP2 outputs "0". When the output of the differentiating circuit 22 is less than the threshold VTH2, the comparator COMP2 outputs "1".

The outputs of the comparators COMP1 and COMP2 are input in an OR gate. The OR gate outputs a logical sum of the outputs of the comparators COMP1 and COMP2 to control ON and OFF of a transistor T2. At a normal time when the sensor 14 detect no impact, the output of the OR gate is "0", and the transistor T1 is kept OFF. If the sensor 14 detects an impact, the output of the OR gate becomes "1", and the transistor T1 becomes ON, so that the passenger seat side squib PS is ignited to work the inflator.

In this embodiment, the rectifier circuit 21 and the comparator COMP1 constitute a first ignition control circuit which outputs an ignition command signal for the inflator by judging the output from the oscillator circuit 20. At the same time, the rectifier circuit 21, the differentiating circuit 22 and the comparator COMP2 constitute a second ignition control circuit which outputs an ignition command signal for the inflator by judging the output from the oscillator circuit 20.

An overall operation of thus constructed side air bag device is described below.

First, the oscillating frequency f of the oscillator circuit 20 is decided by the inductance of the coil L and the capacitances of the capacitors C1 and C2. On the other hand, the inductance of the coil L changes depending on the distance between the coil L of the sensor 14, 18 and the rocker panel 2 as a detected body. Therefore, in assembling the device, the distance between the coil L and the rocker panel 2 is set at such a prescribed value as the oscillator 20 oscillates at the oscillating frequency f into a resonant state. However, in actuality, a little change or shift takes place in such a distance depending on positional accuracy in assembling the sensor 14, 18 and the rocker panel 2. Therefore, the distance between the coil L and the rocker panel 2 is set within such a fixed range as the oscillator circuit 20 oscillates at the resonant frequency f or at a frequency near the resonant frequency, taking account of the above assembling accuracy, error, tolerance or the like. Thus, when the distance between the coil L and the rocker panel 2 is within the fixed range, the oscillator circuit 20 oscillates at the resonant frequency f or at the frequency near the resonant frequency f. At this time, the transistor T1 outputs the largest current or near its largest value. Moreover, a predetermined voltage V is generated at the resistor R3 by voltage drop, and the magnitude of the voltage V becomes the highest or near its largest value. It is decided by the assembling accuracy or the like of the rocker panel 2 and the sensor 14, 18 whether or not the magnitude of the voltage V becomes the highest or near the highest voltage.

The electricity of the voltage V from the oscillator circuit 20 is rectified by the diode D of the rectifier circuit 21 and charged in the capacitor C4. Here, the resistor R4 is used for discharging electricity charged in the capacitor C4. A change rate of the voltage V of the electricity charged in the capacitor C4 is detected by the differentiating circuit 22, which is composed of the capacitor C5 and the resistor R5. The magnitude of the voltage V of the electricity charged in the capacitor C4 is compared with the threshold VTH1 in the comparator COMP1. The change rate of the voltage V of the electricity charged in the capacitor C4 is compared with the threshold VTH2 in the comparator COMP2.

The threshold VTH1 of the comparator COMP1 is set taking account of the voltage outputted from the rectifier circuit 21 at the time of side collision, namely, a value largely decreased from a normal value. The threshold VTH2 of the comparator COMP2 is set taking account of the voltage change rate outputted from the differentiating circuit 22 at the time of a side collision.

When there is no side collision and the distance between the sensor 14, 18 and the rocker panel 2 is within the fixed range, the oscillator circuit 20 maintains the resonant state or near-resonant state. Then, the output current of the transistor T1 is the largest or near its largest value, and the voltage V at the resistor R3 keeps the highest value or near the highest value. At this time, the highest or near-highest voltage of is input in the comparator COMP1 after discharged from the capacitor C4 of the rectifier circuit 21. Then, the voltage magnitude is larger than the threshold VTH1, and the output of the comparator COMP1 becomes "0". Moreover, the voltage change rate is obtained by differentiating the voltage V charged in the capacitor by the differentiating circuit 22, and such rate is nearly zero and less than the threshold VTH2. Then, the output of the comparator COMP2 becomes "0". Since the outputs of both the comparators COMP1 and COMP2 are "0", the output of the OR gate becomes "0". Thus, the transistor T2 is kept OFF, and the squib PS of the passenger seat side inflator remains unfired.

That is, in the normal state where there takes place no side collision, the distance between the rocker panel 2 and the coil L is kept within the fixed range. Then, the oscillating frequency f becomes the predetermined one since it is determined by the inductance of the coil L and the capacitances of the capacitors C1 and C2. Thereby, the predetermined voltage (largest voltage or near-largest voltage) is generated at the resistor R3 of the oscillator circuit 20 by the voltage drop.

However, when the rocker panel 2 is deformed inside by a collision or the like and the distance between the rocker panel 2 and the coil L changes rapidly and largely, the oscillator circuit 20 comes out of its oscillating state or resonance point depending on the inductance at the time. At this time, the output current of the transistor T1 drastically decreases from the largest or near-largest current, and the voltage V of the resistor R3 is lowered.

This voltage of electricity is rectified by the diode D and charged in the capacitor C4 in the rectifier circuit 21. Thereafter, the change rate of the voltage of the capacitor C4 is detected in the differentiating circuit 22, and compared with the threshold VTH2 in the comparator COMP2. When the voltage change rate becomes the threshold VTH2 or more, the comparator COMP2 outputs "1". The output of the comparator COMP2 is applied to the transistor T2 via the OR gate. Then, the transistor T2 becomes ON to ignite the squib PS and operate the passenger seat side inflator.

When the rocker panel 2 is deformed inside slowly and steadily by contact with an obstacle or collision or the like and the distance between the rocker panel 2 and the coil L changes slowly and steadily, the oscillator circuit 20 comes out of its oscillating state or resonance point depending on the inductance at the time. Then, the output current of the transistor T1 decreases from the largest or near-largest current, and the voltage V of the resistor R3 is lowered.

This voltage of electricity is rectified by the diode D and charged in the capacitor C4 in the rectifier circuit 21. When the voltage V of the capacitor C4 becomes less than the threshold VTH1, the comparator COMP1 outputs "1". The output of the comparator COMP1 is applied to the transistor T2 via the OR gate. Then, the transistor T2 becomes ON to ignite the squib PS and operate the passenger seat side inflator.

Though only the operation of the passenger seat side air bag device is described above, the driver seat side air bag device has the same structure and functions in the same manner. Moreover, it is possible to provide a side air bag device of the same structure on a rear seat side.

As shown in FIG. 7, this embodiment of the air bag device is provided with the first ignition control circuit which compares the voltage output of the rectifier circuit 21 with the threshold VTH1 at the comparator COMP1 and the second ignition control circuit which compares the output of the voltage change rate of the differentiating circuit 22 with the threshold VTH2 at the comparator COMP2. Then, the outputs of the first comparator COMP1 and the second comparator COMP2 are input in the OR gate to switch on the transistor T2. However, only one of the first and second ignition control circuit may be used to control the ignition of the squib DS, PS of the inflator.

For example, the ignition control circuit may be constituted at least by the oscillator circuit 20, the rectifier circuit 21, the differentiating circuit 22 and the comparator COMP2. The comparator COMP1 and the OR gate are omitted. In this case, when the distance between the rocker panel 2 and the coil L rapidly changes, the oscillator 20 comes out of the resonance point depending on the inductance at the time. Then, the output current of the transistor T2 rapidly decreases, and the voltage of the resistor R3 is lowered. Accordingly, the differentiating circuit 22 outputs the voltage change rate into the comparator COMP2 in response to the drop of the voltage V of the resistor R3. Thereafter, when the output of the differentiating circuit 22 becomes VTH2 or more, the comparator COMP2 outputs "1". Thus, the transistor T2 becomes ON and ignites the squib DS, PS of the inflator to operate the air bag.

In such a modification, the oscillator circuit 20 outputs the highest voltage v of the resonance point or a voltage near it, due to the assembling accuracy or error between the rocker panel 2 and the sensor 14, 18. However, such assembling error can be lessened by adjusting a resonance condition Q, a diameter and a number of turns of the coil L and supply current. On the other hand, in this modification, even if the sensitivity of the sensor 14, 18 is set high in order to heighten the resonance condition Q, the differentiating circuit 22 detects a velocity of the rocker panel 2 deforming inwardly to provide a signal for determining a collision, so that there is no influence of the assembling error.

Moreover, the oscillator circuit 20 keeps the self-excited oscillation in the normal state. On the other hand, when the oscillator circuit 20 stops the self-exited oscillation, it is decided that the rocker panel 2 is deformed by collision and such collision is determined by the deforming speed of the rocker panel 2. Therefore, the air bag device will not operate when an impact or crash energy is small and it is unnecessary to inflate the air bag such when the side body of the car is scratched or deformed slightly by contact with a garage structure or the like. Furthermore, the air bag device keeps the oscillator circuit 20 self-excitedly oscillating and detect the positional change rate of the rocker panel 2 facing the oscillator circuit 20. Therefore, the air bag device can always monitor a fixed area and a detection of high reliability is possible. In addition, since a self-excited oscillation circuit is adopted as the oscillator circuit 20, there is no need to add an external circuit element for forced oscillation, and the circuitry can be simplified.

In the circuit shown in FIG. 7, the ignition control circuit may be made at least of the oscillator circuit 20, the rectifier circuit 21 and the comparator COMP1, while omitting the differentiating circuit 22, the comparator COMP2 and the OR gate. In this case, the squib DS, PS of the inflator is ignited depending on the magnitude of the change of the distance between the rocker panel 2 and the coil L at the time of collision or the like. Namely, the rocker panel 2 is deformed inwardly by the collision or the like, and the average distance between the rocker panel 2 and the coil L is changed gradually. Even in this case, the oscillator circuit 20 comes out of the resonance point depending on the inductance of the coil L at the time. Then, the output current of the transistor T2 rapidly decreases, and the voltage of the resistor R3 is lowered. Accordingly, the rectifier circuit 21 rectifies such a reduced voltage of electricity and outputs the reduced voltage V of the electricity into the comparator COMP1. Thereafter, when the output of the rectifier circuit 21 becomes less than the threshold VTH1, the comparator COMP1 outputs "1". Thus, the transistor T2 becomes ON and ignites the squib DS, PS of the inflator to operate the air bag.

Since such a modification of the air bag device detects the positional change of a portion of the rocker panel 2 facing the coil L, the air bag device can always monitor a fixed area and detect a collision with high reliability. For example, this air bag device can deal with the case in which the vehicle skids aside on a frozen road or the like. Moreover, it can operate even with the vehicle body 1 already deformed.

Compared with the above two modifications, the air bag device of the embodiment shown in FIG. 7 ignites the squib DS, PS to inflate the air bag at either time when the rocker panel 2 is rapidly deformed inwardly or when it is deformed to a large degree. Namely, the output of the rectifier circuit 21 is detected by the first ignition control circuit, which is formed by the rectifier circuit 21 and the comparator COMP1, and the second ignition control circuit, which is formed by the circuits 21 and 22 and the comparator COMP2. Then, either of the ignition control circuits output an ignition signal to the inflator.

The air bag device can be set so as to respond to different cases of collisions or the like by appropriately combining the embodiment of FIG. 7 and the above two modifications. For example, the air bag device may be structured to respond only when there arises a rapid change in the distance between the rocker panel 2 and the coil L. Or the air bag device may be structured to respond only when there arises a predetermined change in the distance between the rocker panel 2 and the coil L. Otherwise, the air bag device may be structured to respond at either of the above two cases. In these cases, the air bag device may be formed such that it obtains a desired output according to the position to be mounted or sensed in the embodiment of FIG. 7 or either modification.

The ignition control circuit may be constructed such that it outputs an ignition command signal to the inflator only when the output value of the rectifier circuit 21 and the change rate of the output value satisfy predetermined conditions at the same time, in order to improve the reliability.

Figure 8:
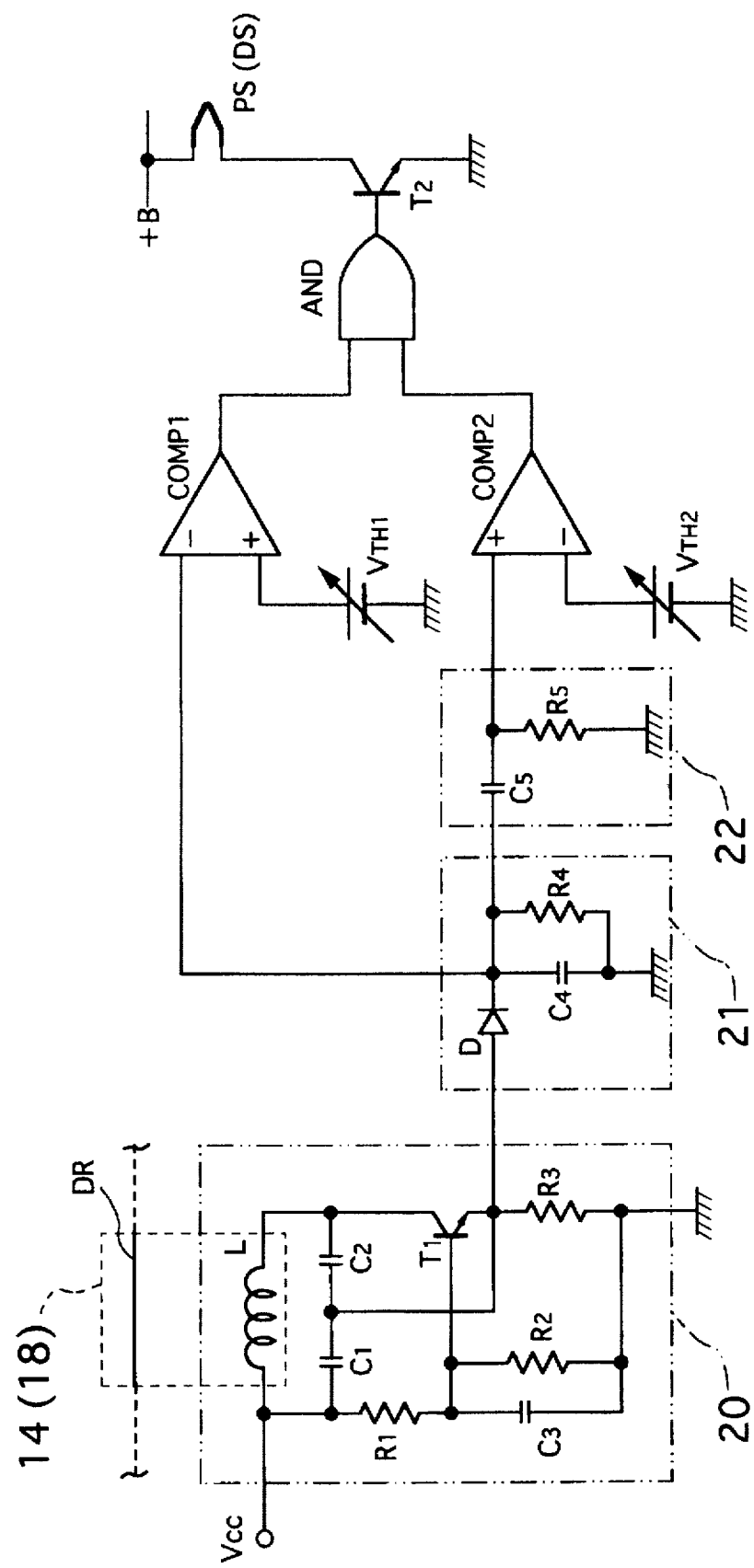
FIG. 8 is a circuit diagram showing a control system of a second embodiment of an air bag device of the invention.

FIG. 8 shows an ignition control circuit according to a second embodiment of an air bag device of the invention.

In this embodiment, an AND gate substitutes for the OR gate of the first embodiment shown in FIG. 7. Such an air bag device operates as follows. The rectifier circuit 21 and the comparator COMP1 determines if the output value of the rectifier circuit 21 is larger than the threshold VTH1 or not. The rectifier circuit 21, the differentiating circuit 22 and the comparator COMP2 determines if the output change rate of the rectifier circuit 21 is larger than a predetermined change rate (threshold VTH2) or not, on the basis of the output of the differentiating circuit 22. When the outputs of the both comparators COMP1 and COMP2 are "1" at the same time, an output of the AND gate becomes "1", and an ignition command signal is outputted to the inflator. Namely, the second embodiment simultaneously judges the inductance change and its change rate, both of which decide the oscillating condition of the oscillator circuit 20. Thus, the air bag device has higher working reliability.

In the above embodiments, the coil L and the detected body of the sensor 14, 18 is located at the seat frame 7 and the rocker panel 2. Thus, assembling of the air bag device is easy. However, the inventive air bag device can be disposed at other portions of the vehicle body 1. Namely, the detecting coil L and the detected body of the eddy current position sensor 14, 18 may be located at opposite positions on a part easy to deform and a part difficult to deform in the vehicle body 1 at the beginning of collision so that they decide the oscillating condition of the oscillator circuit 20.

That is, the inventive sensor can be disposed on at least one place between an inner plate and an outer plate inside a pillar, an inner panel and an outer panel inside a door and the rocker panel 2 and the seat frame 7. The inventive air bag device can be applied to a head-on collision air bag device in a cab-over vehicle such as a truck or a bus, which has a small crashable zone. In this case, a sensor is provided on a place between a floor panel and a reinforcing member or between the floor panel and a front panel of the cab-over vehicle. These modified embodiments are described hereafter.

Figure 9:
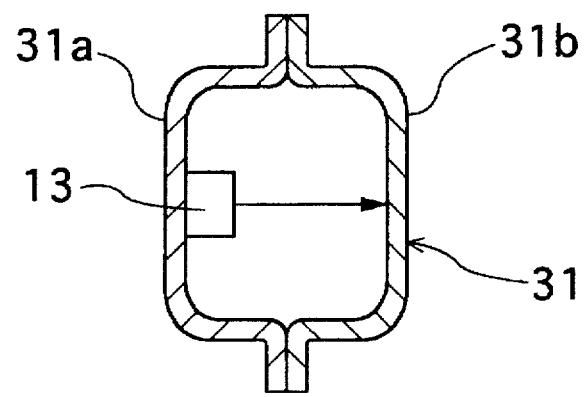
FIG. 9 is an explanatory view showing a specific attaching position of a sensor unit of a third embodiment of an air bag device of the invention.

FIG. 9 shows a mounting position of a third embodiment of an air bag device of the invention.

In this embodiment, the sensor unit 13 is mounted on an inner plate 31a inside a pillar 31 such as a center pillar so that the coil L of the eddy current position sensor 14, 18 is placed at the cabin side. On the other hand, an outer plate 31b of the pillar 31 is used for a metal body as a detected body of the sensor 14, 18. Thus, the outer plate 31b of the pillar 31 is deformed inwardly at the time of collision, thereby changing the distance between the outer plate 31b and the coil L. Then, the ignition control circuit in the sensor unit 13 outputs an ignition signal to the squib DS, PS of the inflator.

Figure 10:
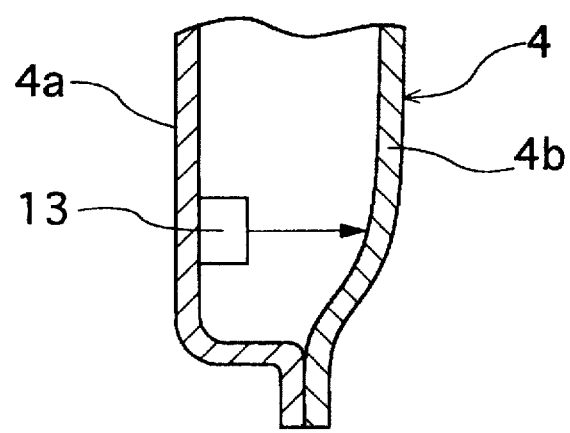
FIG. 10 is an explanatory view showing a specific attaching position of a sensor unit of a fourth embodiment of an air bag device of the invention.

FIG. 10 shows a mounting position of a fourth embodiment of an air bag device of the invention.

In this embodiment, the sensor unit 13 is mounted on an inner panel 4a inside a door 4 so that the coil L of the eddy current position sensor 14, 18 is placed at the cabin side. On the other hand, an outer panel 4b of the door 4 is used for a metal body as a detected body of the sensor 14, 18. Thus, the outer panel 4b of the door 4 is deformed inwardly at the time of collision, thereby changing the distance between the outer panel 4b and the coil L. Then, the ignition control circuit in the sensor unit 13 outputs an ignition signal to the squib DS, PS of the inflator.

Figure 11:
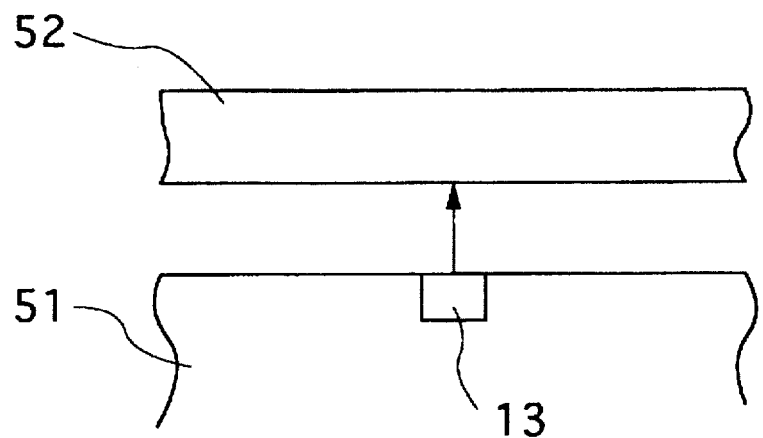
FIG. 11 is an explanatory view showing a specific attaching position of a sensor unit of a fifth embodiment of an air bag device of the invention.

FIG. 11 shows a mounting position of a fifth embodiment of an air bag device of the invention.

This embodiment is employed in a head-on collision air bag device for a cab-over vehicle such as a truck or bus. Air bag modules for head-on collision are disposed in front of the driver seat and passenger seat, respectively. The air bag module connects thereto the sensor unit 13. The sensor unit 13 is attached to a front end of a floor panel 51 so that the coil L of the eddy current position sensor 14, 18 is placed at the cabin side. On the other hand, a reinforcing member 52 in front of the floor panel 51 is used for a metal body as a detected body of the sensor 14, 18. Thus, the reinforcing member 52 is deformed rearwardly (to the cabin side) at the time of collision, thereby changing the distance between the reinforcing member 52 and the coil L. Then, as in the above embodiments, the ignition control circuit in the sensor unit 13 outputs an ignition signal to the squib DS, PS of the inflator, according to a magnitude of such a distance change or a change speed of the distance. Thereby, an air bag in the air bag module is inflated and expanded.

Figure 12:
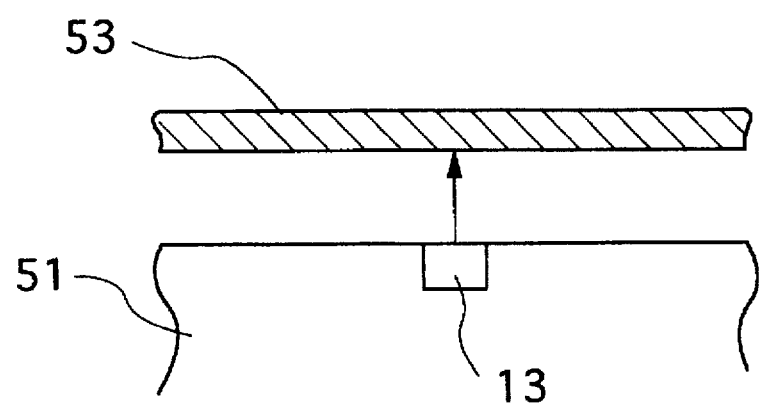
FIG. 12 is an explanatory view showing a specific attaching position of a sensor unit of a sixth embodiment of an air bag device of the invention.

FIG. 12 shows a mounting position of a sixth embodiment of an air bag device of the invention.

This embodiment substitutes a front panel 53 for the reinforcing member 52 of the fifth embodiment, as a detected body of the sensor 14, 18. Namely, the front panel 53 in front of the floor panel 51 is used for a metal body as the detected body. Thus, the front panel 53 is deformed rearwardly (to the cabin side) at the time of collision, thereby changing the distance between the front panel 53 and the coil L. Then, as in the above embodiments, the ignition control circuit in the sensor unit 13 outputs an ignition signal to the squib DS, PS of the inflator, according to a magnitude of such a distance change or a speed at which the distance changes. Thereby, an air bag in the air bag module is inflated and expanded.

Figure 13:
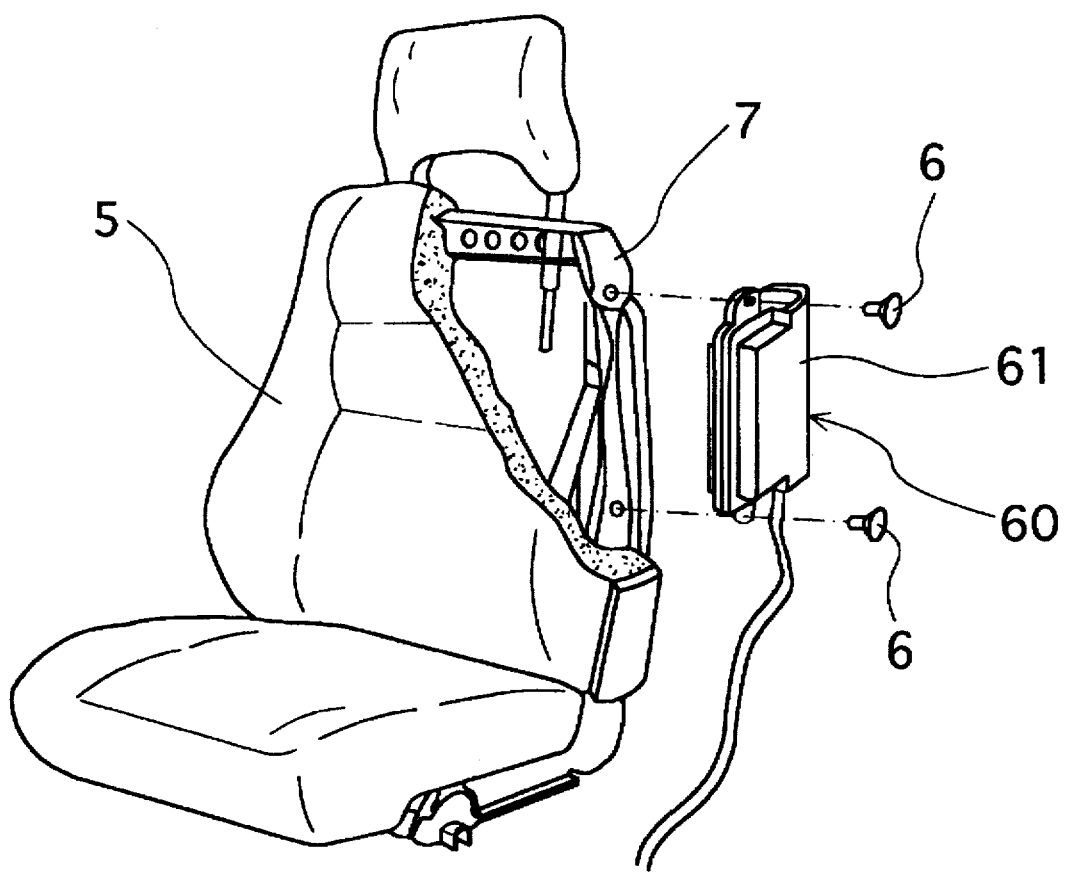
FIG. 13 is a perspective view showing a seventh embodiment of an air bag device of the invention together with a seat to which the air bag is mounted.

FIG. 13 shows a seventh embodiment of an air bag device of the invention.

While the first embodiment provides the sensor unit 13 separately from the air bag module 10, the seventh embodiment of the air bag device assembles a sensor unit of the same structure as the sensor unit 13 inside a casing 61 of a non-magnetic material of an air bag module 60. The sensor unit (not shown) has the circuitry of FIG. 7 or FIG. 8. Moreover, the sensor unit 14, 18 is constituted by the coil L inside the casing 61 and the inner panel 4a of the door as the metal body. Thus, the inner panel 4a of the door 4 is deformed inwardly at the time of collision, thereby changing the distance between the coil L and the inner panel 4a. Then, as in the above embodiments, the ignition control circuit in the sensor unit outputs an ignition signal to the squib DS, PS of the inflator, according to a magnitude of such a distance change or a speed at which the distance changes. Thereby, an air bag in the air bag module is inflated and expanded. In the present embodiment, the sensor unit is provided integrally inside the air bag module 60, so that an overall structure of the device is simplified and compact.

Each above embodiment monitors the distance between the coil L and a metal body such as the rocker panel 2 on the basis of the magnitude of the voltage or change rate of the voltage outputted from the oscillator circuit 20 by its self-excited oscillation. However, the present invention may be modified in other ways, as long as the resonance condition of the oscillator circuit 20 is changed according to the distance change between the coil L and the rocker panel 2 so as to determine that a collision occurs when the oscillator circuit 20 comes out of such a resonance condition. Therefore, the distance between the coil L and the rocker panel 2 can be monitored by detecting a resonance current, and a collision can be detected thereby, instead of using the oscillator circuit 20.

Namely, the oscillator circuit 20 is means for detecting whether or not the resonance condition is maintained. Therefore, it is possible to provide other means for deciding whether or not the resonance condition is maintained, in place of the oscillating circuit 20.

Figure 14:
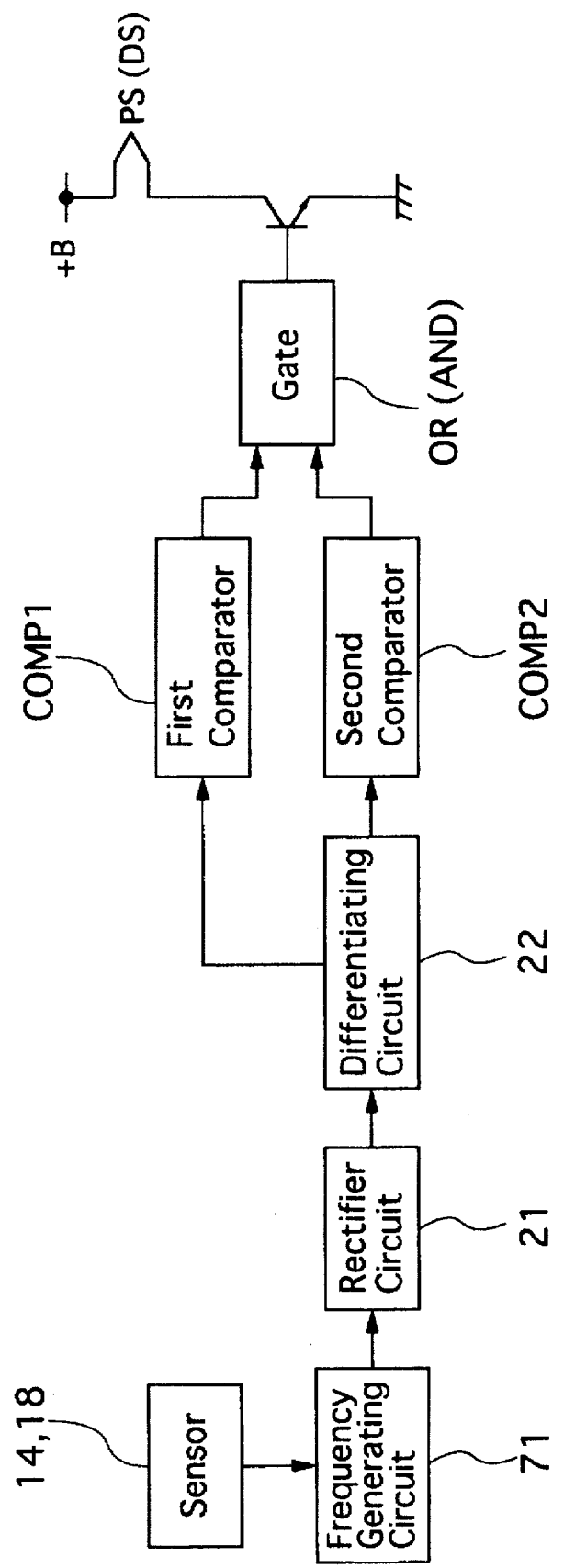
FIG. 14 is a circuit diagram showing a modification of a resonance circuit of the inventive air bag device.

In such a modification, when the metal body such as the rocker panel 2 is deformed inwardly to the cabin side and the distance between the metal body and the coil L is changed, the inflator is operated by the squib DS, PS based on a changing amount or a changing speed, thereby inflating the air bag. Moreover, the air bag device can be operated only by monitoring the inductance value of the coil L at the time. Consequently, it is possible to use a self-excited oscillating circuit or a separately excited oscillating circuit, namely, a frequency generating circuit 71 (see FIG. 14) or a filter 81 (see FIG. 15). Thus, freeness in designing the circuitry is large.

In case of using the frequency generating circuit 71 or filter 81, it is possible to use a self-excited oscillating circuit or a separately excited oscillating circuit. If the filter is used as the resonance circuit, the circuitry can be designed and structured easily. Moreover, since the detected body of the sensor 14, 18, which constitutes a part of the circuitry, is made of the a portion of the vehicle body 1 such as the rocker panel 2, special structure for the sensor 14, 18 is unnecessary.

While, in the above embodiments, the ignition control circuit is housed inside the sensor unit 13 or the casing 11 of the air bag module 10, it may be disposed separately therefrom. For example, the ignition control circuit may be assembled in an inside space of the door 4 or an inside space of the seat. Namely, the ignition circuit can be structured integrally with the sensor 14, 18 or separated therefrom. Particularly, if the ignition circuit is incorporated inside the sensor unit 13, there is no need to provide a wiring harness for connecting the sensor 14, 18 and the ignition control circuit between the door and the seat in case of detecting the side collision. As a result, the air bag device can be assembled only at one side, the door side or the seat side.

While, in the above embodiments, the Colpitts circuit is used for the oscillator circuit 20, Hartley circuit, Clapp circuit or transistor-coupled oscillating circuit or the like may be used instead thereof. Particularly, though the Colpitts oscillator circuit has one coil L, the Hartley oscillator circuit uses two coils, so that wider sensing is possible.

The preferred embodiments described herein are therefor illustrative and not restrictive. The scope of the invention is intended to extend to variations including equivalent structures, means, and uses, within the spirit and scope of the appended claims.

What is claimed is:

1. An air bag device provided in a cabin of a vehicle, comprising:

an air bag disposed in said cabin;

an inflator for inflating said air bag;

an eddy current position sensor having a coil and a metal body, said coil and said metal body being disposed on opposite portions of said vehicle so as to face each other, one of said opposite portions being relatively easily deformable while the other of said opposite portions being more difficult to deform during a collision; and an ignition control circuit including a resonance circuit having a resonance condition influenced by an inductance of said coil, the ignition control circuit being constructed and arranged to output an ignition command signal to said inflator based upon an output from said resonance circuit when said one portion is deformed.

2. An air bag device according to claim 1, wherein said ignition control circuit further includes a rectifier circuit rectifying said output of said resonance circuit, said ignition control circuit detecting an output from said rectifier circuit and outputting said ignition command signal based upon at least one of an output value and a change rate of said output value of said rectifier circuit.

3. An air bag device according to claim 1, wherein said ignition control circuit further includes a rectifier circuit rectifying said output of said resonance circuit and a comparator comparing an output value of said rectifier circuit with a predetermined threshold value, said ignition control circuit outputting said ignition command signal when said output value of said rectifier circuit becomes less than said threshold value.

4. An air bag device according to claim 1, wherein said ignition control circuit further includes a rectifier circuit rectifying said output of said resonance circuit, a differentiating circuit differentiating an output value of said rectifier circuit to obtain a change rate of said output value and a comparator comparing an output of said differentiating circuit with a predetermined threshold value, said ignition control circuit outputting said ignition command signal when said output of said differentiating circuit exceeds said threshold value.

5. An air bag device according to claim 1, wherein said ignition control circuit further includes a rectifier circuit rectifying said output of said resonance circuit, a first comparator comparing an output value of said rectifying circuit with a first predetermined threshold value, a differentiating circuit differentiating said output value of said rectifying circuit to obtain a change rate of said output value and a second comparator comparing an output of said differentiating circuit with a second predetermined threshold value, said ignition control circuit outputting said ignition command signal either when said output value of said rectifier circuit becomes less than said first threshold value or when said output of said differentiating circuit exceeds said second threshold value.

6. An air bag device according to claim 1, wherein said ignition control circuit further includes a rectifier circuit rectifying said output of said resonance circuit, a first comparator comparing an output value of said rectifying circuit with a first predetermined threshold value, a differentiating circuit differentiating said output value of said rectifying circuit to obtain a change rate of said output value and a second comparator comparing an output of said differentiating circuit with a second predetermined threshold value, said ignition control circuit outputting said ignition command signal when said output value of said rectifier circuit becomes less than said first threshold value while said output of said differentiating circuit exceeds said second threshold value.

7. An air bag device according to claim 1, wherein said coil of said eddy current position sensor is disposed on one of a seat frame, an inner plate inside a pillar, an inner panel inside a door and a floor panel of a cab-over vehicle, and said metal body is formed by a portion, facing said coil, of one of a rocker panel, an outer plate inside said pillar, an outer panel inside said door, a reinforcing member of said cab-over vehicle and a front panel of said cab-over vehicle.

8. An air bag device according to claim 1, wherein said resonance circuit is one of a frequency generating circuit and a filter.

* * * * *